United States Patent [19]
Pusey

[11] 3,892,685
[45] July 1, 1975

[54] POLYURETHANE FOAMS

[75] Inventor: Michael Stanley Pusey, High Wycombe, England

[73] Assignee: Dunlop Limited, London, England

[22] Filed: Nov. 28, 1973

[21] Appl. No.: 419,875

[30] Foreign Application Priority Data

Dec. 6, 1972 United Kingdom .............. 56312/72

[52] U.S. Cl....260/2.5 BB; 260/2.5 AB; 260/2.5 AC; 260/2.5 AJ; 260/2.5 AW; 260/77.5 AB; 260/77.5 NC

[51] Int. Cl. ........................ C08g 22/46; C08g 33/02

[58] Field of Search .. 260/2.5 AW, 2.5 BB, 2.5 AG, 260/2.5 AB, 2.5 AC, 2.5 AJ, 77.5 AB, 260/77.5 NC

[56] References Cited

UNITED STATES PATENTS

| | | | |
|---|---|---|---|
| 3,067,149 | 12/1962 | Dombrow | 260/2.5 BB |
| 3,422,036 | 1/1969 | Ellegast | 260/2.5 AB |
| 3,706,687 | 12/1972 | Rudzki | 260/2.5 AC |
| 3,763,057 | 10/1973 | Diehr | 260/2.5 AW |
| 3,781,235 | 12/1973 | Trott | 260/2.5 AW |
| 3,793,240 | 2/1974 | Smith | 260/2.5 AW |
| 3,803,064 | 4/1974 | Fishbein | 260/2.5 BB |

FOREIGN PATENTS OR APPLICATIONS

| | | | |
|---|---|---|---|
| 1,211,405 | 11/1970 | United Kingdom | 260/2.5 AC |
| 1,131,002 | 6/1962 | Germany | 260/2.5 BB |
| 1,104,394 | 2/1968 | United Kingdom | 260/2.5 AW |

*Primary Examiner*—Donald E. Czaja
*Assistant Examiner*—C. Warren Ivy
*Attorney, Agent, or Firm*—Stevens, Davis, Miller & Mosher

[57] ABSTRACT

A flame resistant polyurethane foam is made from a foam-forming reaction mixture containing a polymeric polyol and an aromatic polyisocyanate to which is added a mixture of a. As a foam modifier, a substance normally effective as a catalyst for the polymerisation of tolylene diisocyanate and b. As an anti-ageing additive for the foam, a precursor of a sulphonic acid.

13 Claims, No Drawings

POLYURETHANE FOAMS

This invention relates to polyurethane foams, particularly flame-resistant polyurethane foams, and to methods of making them.

Conventional polyurethane foams, particularly those derived from polyethers, have little inherent flame-resistance, and in view of the widespread use of polyurethane foam in mattresses, cushions and other upholstery there has arisen an urgent need for satisfactory flame-resistant foam products.

In one aspect the present invention provides a process for the production of flame-resistant polyurethane foam, in which a polymeric polyol is reacted with an aromatic polyisocyanate in a foam-forming reaction mixture which contains:

a. as a foam modifier a substance normally effective as a catalyst for the polymerisation of tolylene diisocyanate (T.D.I.) and b. as an anti-ageing additive for the foam, a precursor of a sulphonic acid.

Foams made according to the present invention not only have excellent flame resistance, but any burning which occurs when they are exposed to a flame is accompanied by considerably less smoke and noxious fumes than is the case when polyurethane foams containing conventional flame retardants are similarly treated.

The polyisocyanate is preferably an aromatic di- or other polyisocyanate, such as tolylene di-isocyanate (T.D.I.). This latter substance can be in the form of a single isomer or mixture of isomers. For example, the 2,4- and 2,6- isomers can be used in the proportions by weight 80:20 or 65:35, commonly known respectively as 80:20 TDI and 65:35 TDI.

As stated above, the foam modifier used in the process of the invention is a substance which is normally effective as a catalyst for the polymerisation of tolylene diisocyanate. By "polymerisation of tolylene diisocyanate" is meant in particular the polymerisation of three molecules of T.D.I. to produce a cyclic trimer or other polymer, usually of isocyanurate or perhydrotriazine structure. It is believed that the foam modifier in the present invention causes polymerization of the T.D.I. in the reaction mixture, at least where pure T.D.I. is initially present.

Substances which catalyse the polymerisation of T.D.I. include the following:

alkali and alkaline earth metal salts of organic and weak inorganic acids, for example salts of carboxylic acids such as sodium and potassium acetate; other metal salts of carboxylic acids, for example lead heptane carboxylate (lead octoate) and calcium naphthenate; alkoxides or phenoxides of alkali or alkaline earth metals, for example sodium methoxide and sodium phenate; quaternary ammonium bases, for example tetramethyl- and tetraethyl-ammonium hydroxide; and certain tertiary amines, for instance tetramethylguanidine.

Substances of particular interest are basic substances, for instance alkali metal hydroxides and alkali metal salts or derivatives of weak organic or inorganic acids. Examples of such acids are mono-carboxylic acids such as acetic acid, and hydroxy-aromatic compounds such as the phenols, for instance phenol itself ($C_6H_5OH$), and boric acid. Thus, suitable modifiers are, for example, sodium phenate, sodium acetate, potassium acetate, sodium tetraborate (borax), sodium sesquicarbonate, and sodium carbonate. Of course, the particular substance or substances used as foam modifier in the process of the present invention should be such that there is no undesirable effect on the foam-forming reaction.

The foam modifiers of particular interest in the process of the present invention are basic substances, preferably readily soluble in water, and it is to such foam modifiers that the following description particularly relates.

The amount of the form modifier incorporated depends upon the particular modifier used and the nature of the components of the foam-forming reaction mixture. Although larger amounts can be used, it is not, in general, necessary to use an amount greater than 1% by weight of the polyol component, and the preferred amount is 0.05–1%, for example 0.1 – 0.5%. However, where the foam modifier is a tertiary amine the preferred amount is somewhat greater, and amounts of up to 5% or even more may be found necessary for good results. The foam modifier, where water-soluble, is conveniently incorporated as a solution in all or part of the water component of the foam-forming reaction mixture.

The polymeric polyol used in the production of the flame resistant foams of this invention is normally a polyether polyol having a high reactivity, though other polyether or polyester polyols can be used. Suitable polyether polyols are, for example, those whose terminal hydroxyl groups include a substantial proportion of primary hydroxyl groups, usually referred to as "reactive" or "ethylene oxide-tipped polyols." Suitable ethylene oxide-tipped polyols are those in which the primary hydroxyl groups constitute at least 10%, especially up to about 70%, of the total number of hydroxyl groups in that polyol. Examples of suitable polyols are ones having 50 – 70% of primary hydroxyl groups. Where the polyol is a triol a suitable molecular weight is in the range 3000 – 6000.

A suitable polymeric polyol is one obtained by reacting a substance having a plurality of active hydrogen atoms with an alkylene oxide (for instance propylene oxide or a mixture of propylene oxide and ethylene oxide), and subsequently reacting the product thus obtained with ethylene oxide so as to introduce terminal primary hydroxyl groups. Polyether polyols of this type are commercially available under the trade name Desmophen 3900 (which is a polyether triol of very high activity having a mean molecular weight of 4500–5100 and an hydroxyl number of 33 – 37), and Propylan M.12.

The flame retardant foams of this invention can be, for example, foams of density up to 64 $kg/m^3$, especially having densities in the range 16 – 64 $kg/m^3$.

There is a marked tendency for the foams of this invention to shrink after being made due to closed cells in the foam. This shrinkage can be overcome by mechanically squeezing or crushing the foam as is well known to those skilled in the art. However, shrinkage of the flame-resistant foams of the invention can be substantially obviated without having to squeeze by the inclusion of subsidiary polyether polyols partly or wholly derived from ethylene oxide in which at least some of the oxyethylene groups in the polyol molecule are in non-terminal positions. These subsidiary polyols which can for example be diols or triols, can contain from 20–80% (especially 40–70%) by weight of oxyethylene groups. Examples of suitable subsidiary polyols are the commercial products G.978 and Propylan G.3650 of Lankro Chemicals Limited, and Pluronic L-35 of Wyandotte. Such subsidiary polyols can be used in any suitable proportion with the major polyol, but it is effective in substantially obviating the formation of closed cells if they are in an amount of from 2–40 (for example 4–15) parts of the total polyol component of the foam-forming reaction mixture. Care should be taken in the amount of the subsidiary polyol or polyols used because too much leads to collapse of the foam. The subsidiary polyol is conveniently a poly (oxyethylene) poly(oxypropylene) polyol whose poly (oxypropylene) segment or segments have a total molecular weight in the range 500–2000, for instance 800–1500. It can, for example, be a triol of molecular weight in the range 2000–3000. Where it has primary hydroxyl terminal groups they can comprise, for example, 35–45% of the terminal groups. The subsidiary polyol can be a substance consisting substantially of oxyethylene groups, for example, polyethylene glycols of low molecular weight e.g., 300–800).

The subsidiary polyol is preferably fed to the mixer for the foam-forming reaction mixture as a separate stream, though satisfactory results have been obtained where it has been previously blended with the major polyol and the blend fed to the mixer.

The sulphonic acid precursor used in the present invention results in an improvement in the ageing properties of the polyurethane foams, especially where the foam modifier is a substance containing an alkali metal, for instance sodium or potassium salts of phenols, or inorganic or carboxylic acids, or alkali metal hydroxides; or other basic substance. The precursor can be, for example, a derivative of an aliphatic or aromatic mono- or poly-sulphonic acid. For example, it can be a derivative of a benzene, toluene or naphthalene sulphonic acid or of an alkane or other aliphatic sulphonic acid. Suitable derivatives are, for example esters, amides and salts of weak bases.

Where the derivative is an ester it can, for example, be an ester of an alcohol having 1–6 carbon atoms, for example methyl, ethyl or propyl alcohol. The ester can be, for example, an "internal ester." Examples of such compounds are sultones which have the general formula:

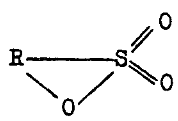

where R is usually a hydrocarbon group having 2 or 3 carbon atoms. 1,3-Propane sultone is an example.

The precursors should be such that neither they, nor any residual substance left after reaction, have an undesirable effect on the reactions in the foam-forming reaction mixture. It is thought that the precursors probably do not release the sulphonic acid until the early stages of the foamforming reaction has occurred, but that they subsequently release it (perhaps owing to the exothermic heat produced in the foam-forming reaction) and the sulphonic acid can then react with alkali metal ions in the foam modifier thereby precluding the deleterious effects of residual alkali metal ions on the foam product (the presence of unreacted alkali metal ions tends to catalyse degradation of the foam).

The amount of the precursor to be used depends of course upon the particular precursor and also upon the type of foam. The amount should preferably be sufficient to generate an excess of the sulphonic acid over that required to neutralise the foam modifier e.g., sodium carbonate. The rate of acid generation will be different for different acidogenic materials and the excess must be great enough to generate the acid before the base catalysed degradation reaction proceeds significantly.

In Example 1 below there is 2.6 times the amount of acid precursor required to neutralise the sodium. For isopropylbenzene sulphonate, 0.6 part is the minimum required to neutralise 0.15 part of sodium carbonate. For 1,3-propane-sultone, the corresponding quantity is 0.35 part. However, in general an amount of 0.5–4% (especially 1.5–3%) of the polyol component has been found to give satisfactory anti-ageing properties.

Many of the substances which can be used as foam modifiers in the present invention (especially basic substances such as sodium hydroxide, or sodium carbonate), are effective as catalysts for the reaction of the polymeric polyol and aromatic polyisocyanate. However, in some cases the foam modifier is not a catalyst for the foam-forming reaction (or is so only to an insufficient extent), and in those cases it is appropriate to use an amine or other catalyst. Even where the foam modifier is a strong base such as sodium hydroxide or sodium carbonate and acts as catalyst for the foam-forming reactions, it may still be necessary to use a supplementary catalyst. For instance, this may be necessary where the polyol component does not have a substantial proportion of terminal primary hydroxyl groups. Examples of such supplementary catalysts are tertiary amines for example, dimethyl ethanolamine, N-methyl and N-ethyl morpholines, triethylamine, and triethylene diamine (also known as 1,4-diazobicyclo-2,2,2-octane).

In general the polyisocyanate and polyol used in the production of the flexible foams of this invention are in amounts such that the isocyanate index (calculated as described in Polyurethanes: Chemistry and Technology, Volume II, Page 54 Interscience Publishers, 1964) is for example in the range 110–130. However, isocyanate index values outside that range can be used if desired, but it has not been found necessary to exceed a value of 150.

It has been found that the use of the process of the invention of more than very small amounts of polysiloxaneoxyalkylene block copolymer surfactants should be avoided as they can detract from the flame-resistance properties of the polyurethane foams obtained. If a polysiloxane-oxyalkylene block copolymer is used it should preferably be in an amount less than 0.1% and preferably not more than 0.05 %. Small proportions of a polydimethyl siloxane as used in the Examples below are not objectionable, for example up to 0.1% ny weight of the weight of the polyol component. Even larger quantities can be used if desired, and satisfactory foams have been obtained using amounts as follows:

| Viscosity of silicone | Amount (parts per 100 of polyol) |
|---|---|
| 2 centistokes | 0.5–4 |
| 5 " | 0.025–0.25 |
| 10 " | 0.025–0.25 |

The polyurethane foams of the invention can be obtained in moulded form by a cold-cure moulding method, that is, a method in which the foam-forming reaction mixture is moulded and allowed to cure without the application of heat.

Although it is not intended that the present invention should be construed with reference to any particular theory, it is thought that the foam modifier has the effect of producing a polyurethane foam having a structure different from that obtained in the absence of the foam modifier such that when subjected to flame the foam tends to collapse and thereby presents a reduced surface area to the flame. This invention is supported by observation of what happens to a foam of the invention when subjected to a flame. For example, when a lighted match is placed on a block of the foam the portion subjected to the heat of the flame readily melts or decomposes and 'retracts" away from the flame but without any sustained burning.

The invention is illustrated by the following Examples in which flexible flame-resistant polyurethane foams were obtained by means of a single stage of "one-shot" process. The isopropyl ester of benzene sulphonic acid (obtained by the reaction of propane-2-01 with benzene sulphonyl chloride) and 1,3-propane sultone were used respectively as sulphonic acid precursors effective as anti-ageing additives. 1,3-propane sultone is believed to have the following structure:

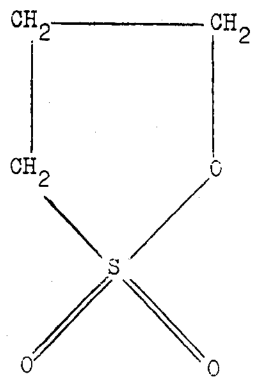

In the Examples the polyol component consists of polyols A and B. Polyol A is a polyether polyol which is a poly(oxypropylene) poly(oxyethylene) triol having a molecular weight of about 5000, a hydroxyl member of 35–37 and a poly(oxyethylene) content of about 12–13% by weight. About 60–70% of its terminal hydroxyl groups are primary hydroxyl groups.

Polyol B is used in the Examples as an anti-shrinkage agent, and is a poly(oxyethylene) poly(oxypropylene) triol having a molecular weight of about 2800, a hydroxyl number of about 59 and a poly(exyethylene) content in the range 60–65% by weight. The proportion of primary hydroxyl groups to secondary hydroxyl groups in this polyol is about 40:60, and the oxyethylene groups are believed to be present largely in non-terminal positions.

The silicone is commercial silicone oil having a viscosity of 5 centistokes and believed to be a dimethyl siloxane homopolymer. The T.D.I. was 80:20 T.D.I.

EXAMPLES 1 – 5

Flexible free-rise foams were obtained using the following formulations:-

| | Control | Examples Nos. | | | | |
|---|---|---|---|---|---|---|
| | | 1 | 2 | 3 | 4 | 5 |
| Polyol A | 87 | 87 | 87 | 87 | 87 | 87 |
| Polyol B | 13 | 13 | 13 | 13 | 13 | 13 |
| Isopropylbenzene sulphonate | — | 1.5 | — | — | — | — |
| 1,3-Propane sultone | — | — | 0.5 | 1.0 | 1.5 | 2.0 |
| Silicone | 0.05 | 0.05 | 0.05 | 0.05 | 0.05 | 0.05 |
| Water | 4.45 | 4.45 | 4.45 | 4.45 | 4.45 | 4.45 |
| Sodium carbonate (anhydrous) | 0.15 | 0.15 | 0.15 | 0.15 | 0.15 | 0.15 |
| T.D.I. | 61.9 | 61.9 | 61.9 | 61.9 | 61.9 | 61.9 |

In these Examples, the amounts of the ingredients are shown in parts by weight.

The procedure used to make the foams was as follows:

The sodium carbonate (dissolved in the water), the silicone fluid and iso-propyl benzene sulphonate (or 1,3-propane sultone) were added to the Polyols A and B which had previously been mixed together. The mixture was stirred for 20 seconds, and then the toluene di-isocyanate was added. The stirring was continued for a further 10 seconds, and the reaction mixture poured into an open mould. After completion of the rise the foam was post-cured for 5 minutes at 120°C in a convection oven. Testing was carried out after the foam had stood for 5 days at ambient temperature.

The physical properties of the resulting foams and flame-resistance according to the test of BS 4735 were assessed after the foam had stood for 5 days at ambient temperatures and the physical properties were again assessed after heat ageing at 140°C for 16 hours.

It was found that the mean extent burned (MEB) and change in physical properties for the various foams were as follows and the foams of the Examples were, therefore to be regarded as self-extinguishing.

| | Control | Example No. | | | | |
|---|---|---|---|---|---|---|
| | | 1 | 2 | 3 | 4 | 5 |
| MEB (mm) | 125 | 30 | 26 | 25 | 25 | 23 |

The physical properties of the foam products of Examples 1–5 were substantially unchanged by the ageing, whereas those of the control were dramatically worse, the foam having crumbled to a powder.

The sulphonic acid precursor can be regarded as a sulphonic acid generator, that is, a substance which under the influence of the foam-forming reaction conditions releases a sulphonic acid which can neutralise basic foam modifiers.

What I claim is:

1. A process for the production of a one-shot flexible flame-retardant polyurethane foam which comprises reacting together in a foam-forming reaction mixture:

a. a polymeric polyol;

b. an aromatic polyisocyanate c. as a foam modifier a substance normally effective as a catalyst for the polymerization of tolylene diisocyanate selected from the group consisting of an alkali metal salt of a weak organic acid and an alkali metal salt of a weak inorganic acid and d. as an additive to prevent the deleterious effect of said foam modifier on ageing of the foam, a substance which releases an aliphatic or aromatic sulphonic acid under the conditions of said foam-forming reaction.

2. A process as claimed in claim 1, in which said additive d) is a derivative of an aromatic sulphonic acid.

3. A process as claimed in claim 1 in which said additive (d) is an ester of a sulphonic acid and an aliphatic alcohol having 1 to 6 carbon atoms.

4. A process as claimed in claim 3, in which said additive d) is a cyclic ester of a sulphonic acid.

5. A process as claimed in claim 4, in which said cyclic ester is a sultone.

6. A process as claimed in claim 5, in which said sultone is 1,3 propane sultone.

7. A process as claimed in claim 1, in which said foam modifier is an alkali metal salt of a weak inorganic acid.

8. A process as claimed in claim 7, in which said foam modifier is sodium carbonate.

9. A process as claimed in claim 1, in which said foam modifier is an alkali metal salt of a weak organic acid.

10. A process as claimed in claim 9, in which said foam modifier is sodium acetate or potassium acetate.

11. A process as claimed in claim 1, in which said foam modifier is present in the foam-forming reaction mixture in an amount of from 0.05 to 1% by weight of said polymeric polyol.

12. A process as claimed in claim 1, in which said sulphonic acid additive d) is present in the foam-forming reaction mixture in an amount of from 0.5 to 4% by weight of said polymeric polyol.

13. A one-shot flexible flame-resistant polyurethane foam produced by reacting together in a foam-forming reaction mixture a polymeric polyol and an aromatic polyisocyanate wherein said foam-forming reaction mixture contains:

a. as a foam modifier, from 0.05 to 1 per cent by weight of polymeric polyol of a substance normally effective for polymerization of tolylene diisocyanate and selected from the group consisting of an alkali metal salt of a weak organic acid and an alkali metal salt of a weak inorganic acid and b. as an anti-ageing additive for the foam from 0.5 to 4 per cent by weight of polymeric polyol of a substance which releases an aliphatic or aromatic sulphonic acid under the conditions of said foam-forming reaction.

* * * * *